(12) United States Patent
Anderson

(10) Patent No.: US 6,211,985 B1
(45) Date of Patent: Apr. 3, 2001

(54) REMOTE MONITORING OF AN OPTICAL TRANSMISSION SYSTEM USING LINE MONITORING SIGNALS

(75) Inventor: Cleo D. Anderson, Colts Neck, NJ (US)

(73) Assignee: Tyco Submarine Systems Ltd., Morristown, NJ (US)

( * ) Notice: Subject to any disclaimer, the term of this patent is extended or adjusted under 35 U.S.C. 154(b) by 0 days.

(21) Appl. No.: 08/908,801

(22) Filed: Aug. 8, 1997

(51) Int. Cl.$^7$ .............................. H04B 10/02; H04B 10/00
(52) U.S. Cl. .......................... 359/174; 359/176; 359/177; 359/143
(58) Field of Search ..................................... 359/174, 175, 359/177, 140

(56) References Cited

U.S. PATENT DOCUMENTS

| | | | |
|---|---|---|---|
| 4,278,850 | * | 7/1981 | Sato et al. ................. 179/175.31 R |
| 5,073,982 | * | 12/1991 | Viola et al. ......................... 359/120 |
| 5,241,414 | * | 8/1993 | Giles et al. ......................... 359/341 |
| 5,436,746 | * | 7/1995 | Hirst ..................................... 359/110 |
| 5,521,737 | * | 5/1996 | Suyama ................................ 359/160 |
| 5,784,192 | * | 7/1998 | Sugiyama et al. ................... 359/341 |
| 5,790,294 | * | 8/1998 | Horiuchi et al. .................... 359/177 |

* cited by examiner

*Primary Examiner*—Leslie Pascal
*Assistant Examiner*—Dalzid Singh

(57) ABSTRACT

An optical transmission system allows for the remote determination of the output power of each carrier for each repeater. The optical transmission system includes two terminals, an optical path that transmits a plurality of optical signals between the two terminals, and a plurality of repeaters spaced along the optical path. At least one of the terminals generates a first line monitor signal and a second line monitor signal. The second line monitor signal is delayed by a round trip delay from the terminal to a repeater at which the output power is desired to be measured. The terminal then transmits the first line monitor signal on the optical path. Each repeater in the transmission system generates a return line monitor signal in response to receiving the first line monitor signal and transmits the return line monitor signal on the optical path.

9 Claims, 3 Drawing Sheets

REMOTE MONITORING OF AN OPTICAL TRANSMISSION SYSTEM USING LINE MONITORING SIGNALS

FIELD OF THE INVENTION

The present invention is directed to remote monitoring of an optical transmission system. More particularly, the present invention is directed to remote monitoring of an optical transmission system using line monitoring signals.

BACKGROUND OF THE INVENTION

Long distance optical transmission systems generally require a plurality of amplifiers located along the length of the optical fibers to periodically amplify the optical signals. It is essential in these systems to provide the ability to remotely monitor the performance of any amplifier, and to locate the source of system degradation or fault to a particular amplifier or fiber section.

Most known methods for remotely monitoring the performance of optical amplifiers in an optical transmission system require an optical loopback path between adjacent amplifiers on the forward and return optical paths, and the generation of a test signal on at least one end of the system. For example, U.S. Pat. No. 5,436,746 discloses an optical transmission system that includes multiple loopbacks. A test signal is generated at the local station, or terminal, and transmitted on a forward path. The test signal is returned to the local station via the optical loopbacks and a return path. Measurement of the test signal provides information that is related to the performance of the amplifiers within the optical transmission system.

The method of using loopback paths to remotely measure the performance of amplifiers has several disadvantages. Specifically, the loopback method requires test signals to be both transmitted and received on associated fiber pairs at a terminal of the transmission system. The test signals must travel over an optical fiber pair (i.e., the forward path and the return path). Therefore, the loop loss information provided by the loopback method is ambiguous because there is no way to tell how the loop losses are distributed between the forward and return path.

Further, the loop loss information provided by the loopback method is redundant because the same information is measured at both terminals of the transmission system. In addition, the optical loopback paths between adjacent amplifiers cause a significant transmission impairment in the form of crosstalk or added noise. Finally, the loopback method, when used to provide information in-service (i.e., while the optical transmission system is transmitting signals) requires a long time (approximately 2–8 hours) to obtain a measurement due to the typical poor signal-to-noise (S/N) ratio of the monitoring signal. Transmission systems that utilize multiple carrier wavelengths, and their corresponding monitoring signal, have lower S/N ratios than single wavelength systems, and therefore obtaining measurements using the loopback method in these systems impose an even greater time delay.

Based on the foregoing, there is a need for a method and apparatus for remotely measuring amplifier performance that provides measurement information quicker and more accurately than known methods, especially when multiple carrier wavelengths are used.

SUMMARY OF THE INVENTION

The above-described needs are met by the present invention which remotely determines the output power of each carrier for each repeater in an optical transmission system. In one embodiment, the optical transmission system includes two terminals, an optical path that transmits a plurality of optical signals between the two terminals, and a plurality of repeaters spaced along the optical path.

At least one of the terminals generates a first line monitor signal and a second line monitor signal. The second line monitor signal is delayed by a round trip delay from the terminal to a repeater at which the output power is desired to be measured. The terminal then transmits the first line monitor signal on the optical path. Each repeater in the transmission system generates a return line monitor signal in response to receiving the first line monitor signal and transmits the return line monitor signal on the optical path.

DETAILED DESCRIPTION

Figure 1:
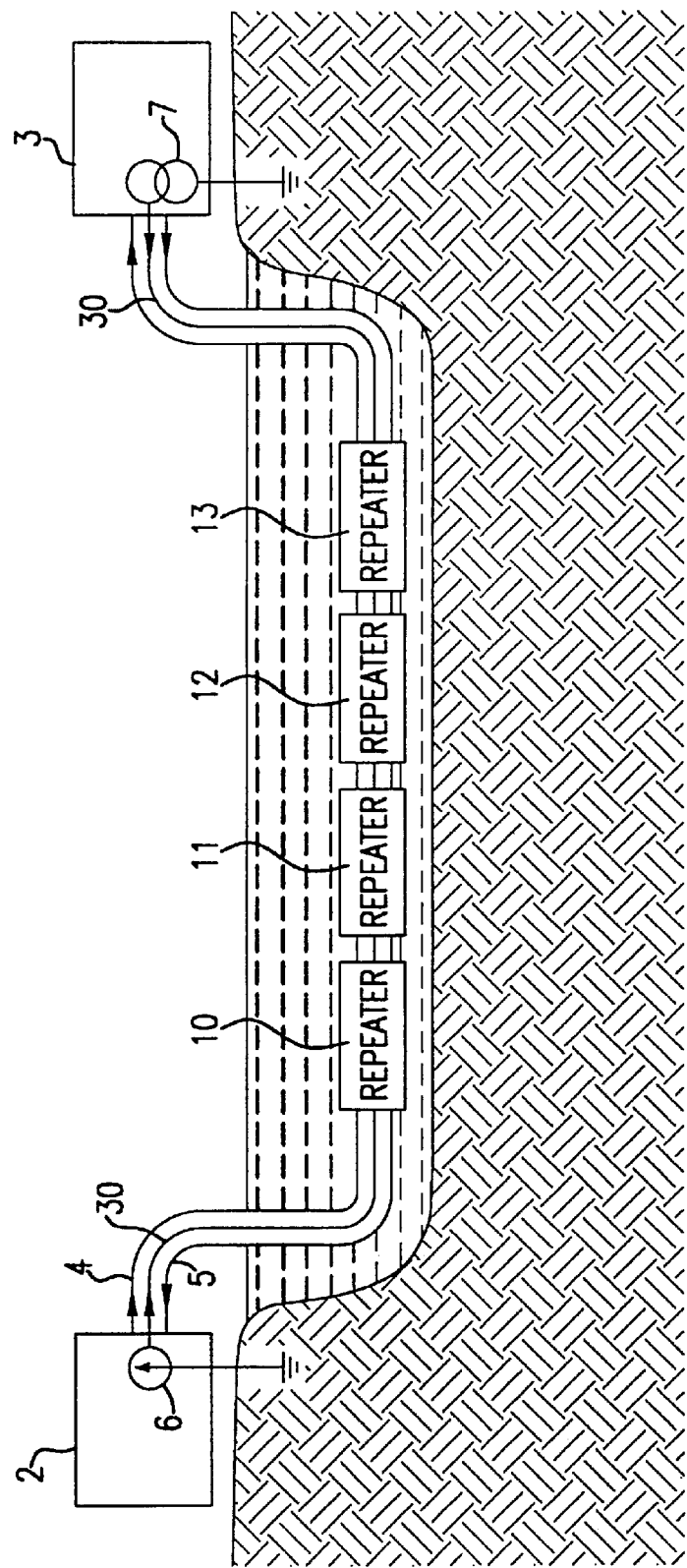
FIG. 1 is an illustration of an optical transmission system in accordance with one embodiment of the present invention.

The present invention provides a measurement of the output power of each optical carrier for each repeater in an optical transmission system. FIG. 1 illustrates an optical transmission system in accordance with one embodiment of the present invention. The transmission system of FIG. 1 is a long distance underwater system that transmits optical communication signals between a terminal 2 and a terminal 3. The communication signals are sent from terminal 2 to terminal 3 via optical path 4 and are sent from terminal 3 to terminal 2 via optical path 5. Each optical path 4, 5 includes up to four optical fibers.

A plurality of repeaters 10–13 are located in a series of predetermined intervals along optical paths 4 and 5. Repeaters 10–13 include an amplifier for each optical fiber passing through them. The amplifiers amplify the optical signals as they travel between terminals 2 and 3.

Terminal 2 includes a constant DC current source 6 which produces a constant electric current of predetermined magnitude. The current provides power to repeaters 10–13 via center conductor 30. Center conductor 30 is connected to voltage source 7 in terminal 3. Both current source 6 and voltage source 7 are connected to ground.

Figure 2:
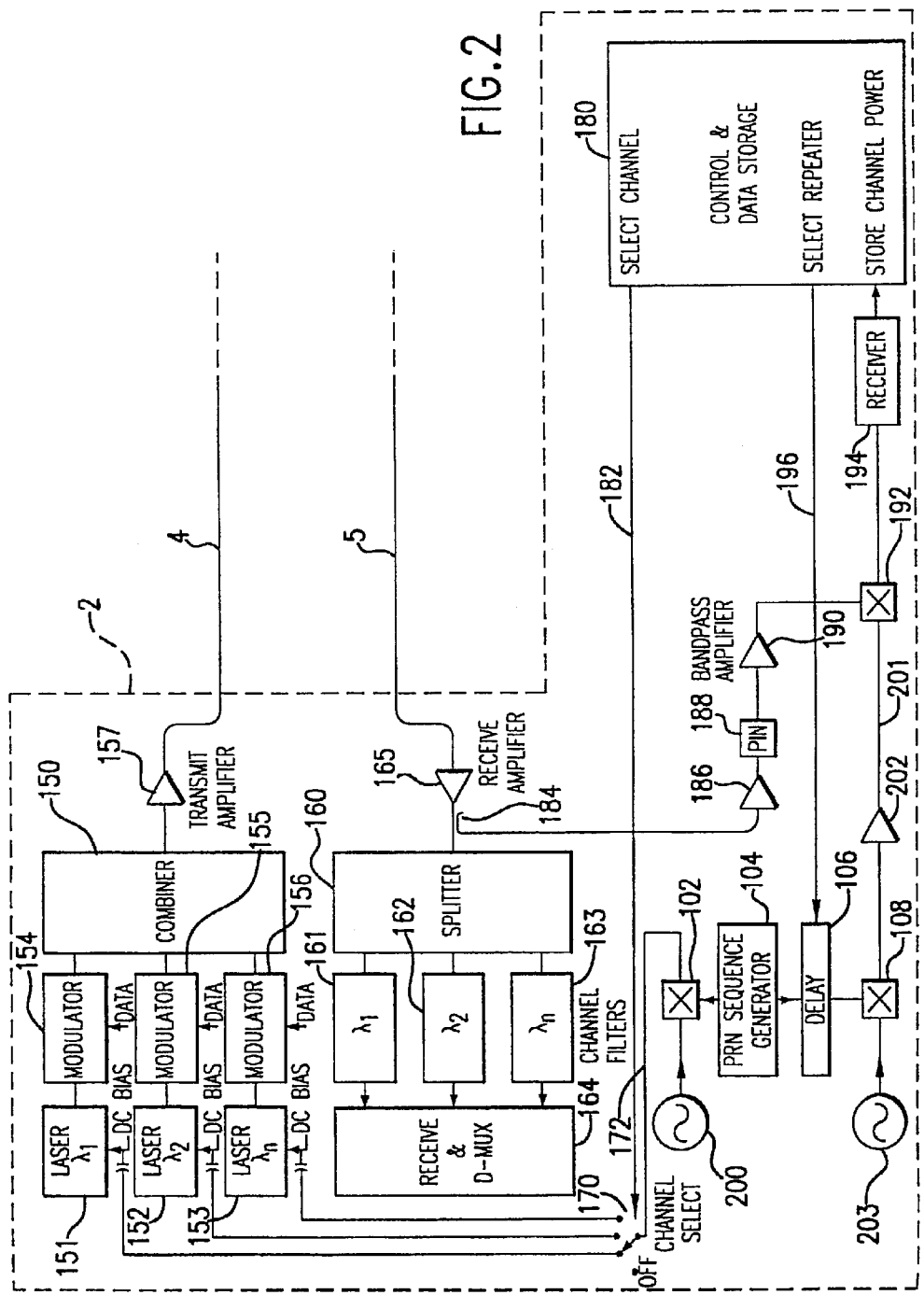
FIG. 2 is a detailed illustration of a terminal in accordance with one embodiment of the present invention.

FIG. 2 is a detailed illustration of terminal 2 in accordance with one embodiment of the present invention. Terminal 2 transmits and receives carrier signals in the form of optical signals in a known manner. In addition, terminal 2 transmits and receives line monitoring signals that are used to measure the power of each carrier of each repeater 10–13 in the optical transmission system.

A plurality of transmit lasers 151–153 generate optical signals at carrier wavelengths "1" to "n". Each transmit laser 151–153 is input to a modulator 154–156. The data desired to be transmitted is also input to modulators 154–156. The signals output from modulators 154–156 are coupled to a combiner 150 where they are combined. The resultant signal is then amplified by transmit amplifier 157 and transmitted on one of the optical fibers in optical path 4.

In addition, in terminal 2 a line monitoring signal is generated and transmitted for each carrier of each repeater that is desired to be measured. In one embodiment, the line monitoring signal is generated by a line monitoring generator circuit. The line monitoring generator circuit generates the line monitoring signal by biphase modulating in a modulator 102 a 150 kHz continuous wave ("CW") sine wave carrier that is generated by an oscillator 200 with a 10 kHz binary pseudo random ("PRN") sequence that is generated by a PRN sequence generator 104. Simultaneously, a 250 kHz CW sine wave carrier that is generated by an oscillator 203 is biphase modulated in a modulator 108 by a replica of PRN sequence 104 and delayed in a delay device 106 by a round trip delay to the repeater desired to be measured. The resulting signal from modulator 108 is output to a 250 kHz bandpass amplifier 202 and then output on line 201 to a line monitor signal receive circuit that is described below.

In other embodiments of the present invention, a line monitoring signal can be transmitted and received in terminal 3, or in both terminal 2 and terminal 3.

To measure the power of an individual carrier at a specified repeater, a channel select switch 170 is set to connect the generated line monitor signal via path 172 to the bias input of the transmit laser 151–153 of the desired carrier to be measured. This causes the line monitor signal to be impressed as a low-level amplitude modulation ("AM") signal on the carrier that is transmitted on optical path 4. In one embodiment, the level of the AM signal is approximately one percent of the level of the carrier signal. The optical carrier containing the line monitor signal is combined with other carriers in combiner 150, amplified in optical amplifier 157 and transmitted to repeaters 10–13 via one of the optical fibers in optical path 4.

Figure 3:
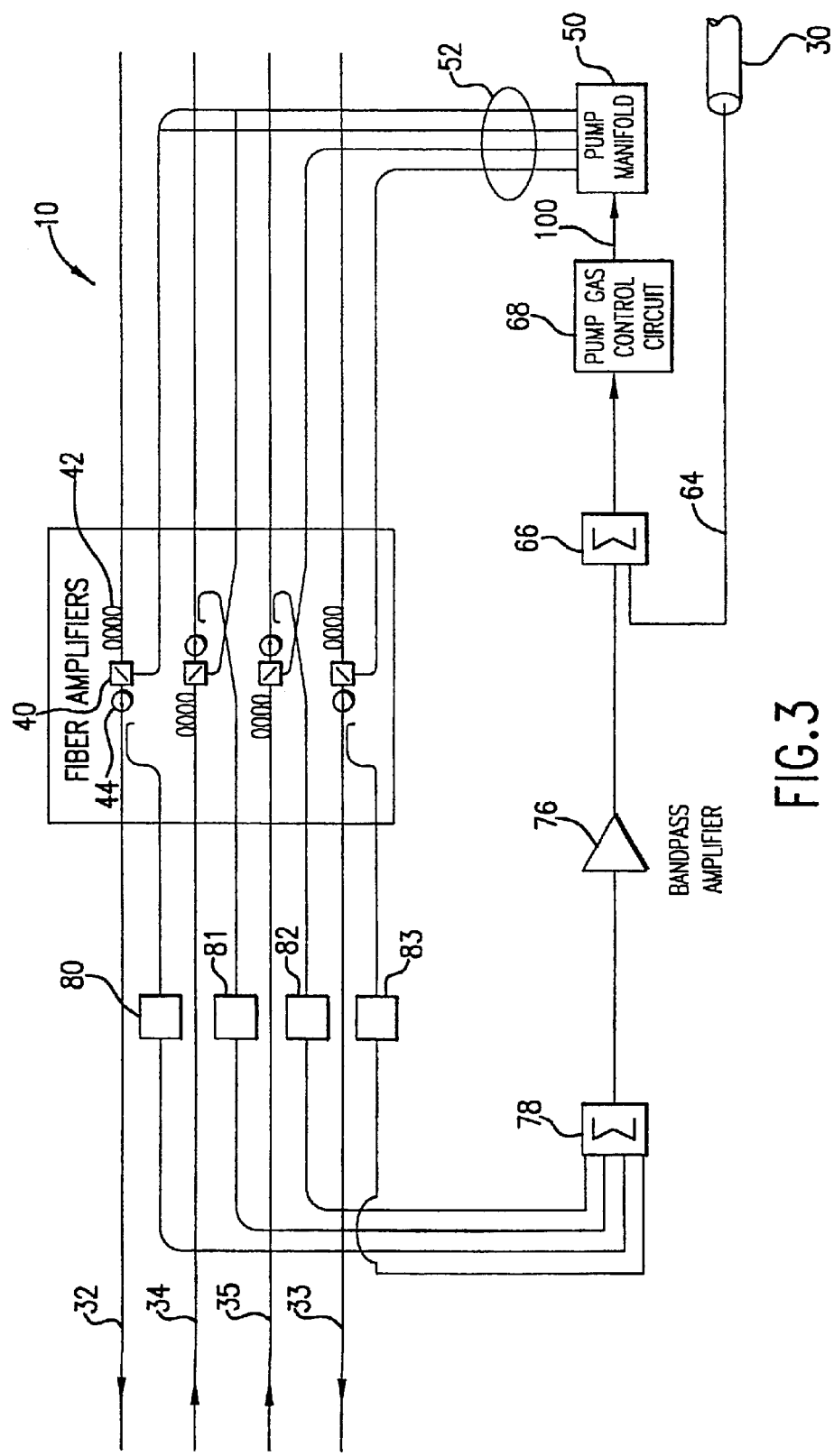
FIG. 3 is a detailed illustration of a repeater in accordance with one embodiment of the present invention.

FIG. 3 is a detailed illustration of repeater 10 in accordance with one embodiment of the present invention. Repeaters 11–13 are identical to repeater 10.

In repeater 10, optical fibers 32 and 33, which form optical path 5 shown in FIG. 1, transmit optical signals from right to left in FIG. 2. Optical fibers 34 and 35, which form optical path 4, transmit optical signals in a direction opposite to that of optical fibers 32 and 33.

A pump manifold 50 includes a plurality of pump lasers. The pump lasers are powered by current received from a pump bias control circuit 68 on path 100. The pump lasers produce pumping power proportional to the input current in a known manner. The pumping power is output from pump manifold 50 on paths 52.

Optical fibers 32–35 each include identical amplifier components. Referring to optical fiber 32, path 52 is coupled to a directional wavelength selective coupler 40. Coupler 40 causes the optical energy output by pump manifold 50 on path 52 to be directed into an erbium doped fiber 42 which amplifies optical signals on optical fiber 32. Optical fiber 32 also includes an optical isolator 44 which prevents power from flowing backwards.

Repeater 10 also includes a signal insertion circuit that inserts a returned line monitor signal onto each amplified optical signal output from the repeater. The returned line monitor signal is generated in response to the line monitor signal transmitted from terminal 2. The power of the inserted returned line monitor signal is proportional to an individual carrier power for that repeater.

The returned line monitor signal insertion circuit for repeater 10 includes photo detectors 80–83 which are coupled to optical fibers 32, 34, 35 and 33, respectively. Photo detectors 80–83 output a current proportional to their respective input optical power. The input optical power includes the line monitor signal transmitted from terminal 2 on one of the outgoing optical fibers coupled to terminal 2. An AC current is output from one of the photo detectors 80–83 in response to the line monitor signal.

The outputs of photo detectors 80–83 are input to a summation device 78. The output of summation device 78 is coupled to the input of a bandpass amplifier 76 whose passband corresponds to the spectrum of the line monitor signal. The output of bandpass amplifier 76, which includes only the AC current output from photo detectors 80–83, is coupled to a summing device 66. The other input to summing device 66 is a DC current via line 64 which is output from center conductor 30.

The output of summing device 66 is input to pump bias control circuit 68 which in turn outputs, via line 100, a DC bias current and an AC current to pump manifold 50. The output power of pump manifold 50 is proportional to the total input current on line 100. The average output power of each amplifier in repeater 10 is proportional to its input pump power. A returned line monitor signal is therefore impressed as very low level amplitude modulation on each of the amplified optical carriers. The returned line monitor signal has a modulation index proportional to the received carrier power at the repeater output.

Referring again to FIG. 2, the line monitor receive circuit of terminal 2 receives the returned line monitor signals inserted by each repeater 10–13. All of the incoming carriers to terminal 2 include a returned line monitor signal. The incoming carriers are received by terminal 2 on the fibers that comprise optical path 5, amplified by an optical amplifier 165 and input to a receive section splitter 160. Each carrier is then filtered by channel filters 161–163 and demultiplexed by demultiplexer 164.

A sample of the incoming signals on optical path 5 are obtained from a directional coupler 184. The sample is amplified by an optical amplifier 186 and detected by a photo detector 188. The electrical signals from the photo detector 188 are input to a bandpass amplifier 190. The output of the bandpass amplifier 190, which contains a received line monitor signal, is demodulated in a demodulator 192 with the delayed carrier from line 201 that was previously described.

The output of demodulator 192 contains a 100 kHz component proportional to the power of the selected carrier at the repeater being measured and an AC (noise) component associated with the data spectra of the incoming carriers that fall into the line monitor signal frequency band. The output of demodulator 192 is input to a 100 kHz receiver 194 whose bandwidth is in the range of 1 to 10 Hz. In one embodiment, the line monitor signal-to-noise ratio in a 1 Hz bandwidth reaches 20 dB within a three second measuring time. In contrast, prior art remote line monitoring systems require many hours of measuring time to achieve similar results.

A control and data storage unit 180 selects which channel and which repeater is measured. The channel is selected via line 182 which is coupled to channel select switch 170. The repeater is selected via line 196 which is coupled to delay device 106. The round trip delay of the desired repeater is input to delay device 106. Control and data storage unit 180 stores the measurements of each channel and each repeater that is output from receiver 194.

When a line monitor signal for each carrier and each repeater has been sent and received by terminal 2, the measurements stored in control and data storage unit 180 enable a level profile of power as a function of wavelength and distance to be created for the optical transmission system.

The present invention provides many improvements over the prior art loopback method. Specifically, signal-to-noise ratio is improved because the line monitor signal is returned as a low level amplitude modulation signal attached to each of the optical carriers rather than an additive signal that competes with one of the returned carriers. The improved signal-to-noise ratio enables the present invention to obtain more accurate information in a reduced time. In addition, the transmission degradation caused by optical loopbacks through the mechanisms of added noise introduced by signal path crosstalk is eliminated. Finally, because the line monitor signal is returned on all fibers and all channels, the need for pairing transmit and receive fibers is eliminated.

The present invention is ideally suited to Wavelength Division Multiplexed ("WDM") systems because the signal-to-noise ratio of the detected returned line monitor signal increases as the product of the number of carriers and the baud rate per carrier.

One embodiment of the present invention is specifically illustrated and/or described herein. However, it will be appreciated that modifications and variations of the present invention are covered by the above teachings and within the purview of the appended claims without departing from the spirit and intended scope of the invention.

For example, although an underwater long distance optical transmission system is described, the present invention can be implemented on any optical transmission system that includes repeaters. Further, other alternative methods of impressing amplitude modulation on the amplified signals other than the method of pump current modulation that is used in the described embodiment can also be implemented.

Further, in an alternative embodiment, the bandwidth of amplifier 76 in each repeater can be reduced to a few Hz by, for example, using a crystal filter. A unique crystal frequency can be assigned to each repeater. In this embodiment, the line monitor signal can be a simple sine wave with a frequency that corresponds to that of the repeater being monitored.

What is claimed is:

1. A method for remotely determining the output power of each optical carrier for any repeater in an optical transmission system that comprises one or more repeaters, a first and second terminal, and optical paths over which are transmitted a plurality of optical carriers between the first and second terminals, said method comprising the steps of:

(a) generating a first line monitor signal at the first terminal;

(b) generating a second line terminal signal at the first terminal, wherein said second line terminal signal is delayed by a round trip delay from the first terminal to a first repeater;

(c) transmitting the first line monitor signal on one of the optical paths;

(d) generating a return line monitor signal at each of said repeaters in reponse to receiving the first line monitor signal;

(e) transmitting the return line monitor signal on one of the optical paths;

(f) receiving the return line monitor signal at the first terminal; and (g) demodulating the return line monitor signal with the second line monitor signal.

2. The method of claim 1, wherein step (c) comprises the step of impressing the first line monitor signal on one of the plurality of optical carriers.

3. The method of claim 2, wherein step (c) further comprises the step of amplitude modulating one of the plurality of optical carriers.

4. The method of claim 1, wherein step (e) comprises the step of impressing the return line monitor signal on one of the plurality of optical carriers.

5. The method of claim 4, wherein step (e) further comprises the step of amplitude modulating one of the plurality of optical carriers.

6. An optical transmission system for transmitting optical signals, said system comprising:

a first terminal and a second terminal;

optical paths coupled to said first and second terminals; and one or more repeaters spaced along said optical paths;

wherein said first terminal generates a first line monitor signal and a second line monitor signal and transmits the first line monitor signal on an optical path and wherein said second line monitor signal is delayed by a round trip delay from the first terminal to a first repeater;

wherein each of said repeaters generates a return line monitor signal in response to receiving the first line monitor signal and transmits the return line monitor signal on an optical path; and wherein said first terminal receives the return line monitor signal and demodulates the return line monitor signal with the second line monitor signal.

7. A terminal for an optical transmission system that comprises one or more repeaters and an optical path coupled to said repeaters and said terminal that transmits a plurality of optical carriers, said terminal comprising:

a line monitor signal generator circuit coupled to said optical path; and a line monitor signal receive circuit coupled to said optical path and said line monitor signal generator circuit;

wherein said line monitor signal generator circuit comprises
   a first and second modulator;
   a first oscillator coupled to said first modulator and a second oscillator coupled to said second modulator;
   a binary pseudo random sequence generator coupled to said first modulator; and
   a delay device coupled to said binary pseudo random sequence generator and coupled to said second modulator.

8. The terminal of claim 7, wherein said line monitor signal receive circuit comprises:

a photo detector coupled to said second optical path;

a third modulator coupled to an output of said photo detector and an output of said second modulator; and a receiver coupled to an output of said third modulator.

9. The terminal of claim 8, further comprising:

a control and data storage unit coupled to said line monitor signal generator circuit and said line monitor signal receive circuit, said control and data storage unit selects the fixed amount of time and one of said plurality of optical carriers and stores an output of said line monitor signal receive circuit.

* * * * *

UNITED STATES PATENT AND TRADEMARK OFFICE
CERTIFICATE OF CORRECTION

PATENT NO.    : 6,211,985 B1
DATED         : April 3, 2001
INVENTOR(S)   : Cleo Anderson Page 1 of 1

It is certified that error appears in the above-identified patent and that said Letters Patent is hereby corrected as shown below:

Figure 3,
Reference numeral 68 "PUMP GAS CONTROL CIRCUIT" should be -- PUMP BIAS CONTROL CIRCUIT --

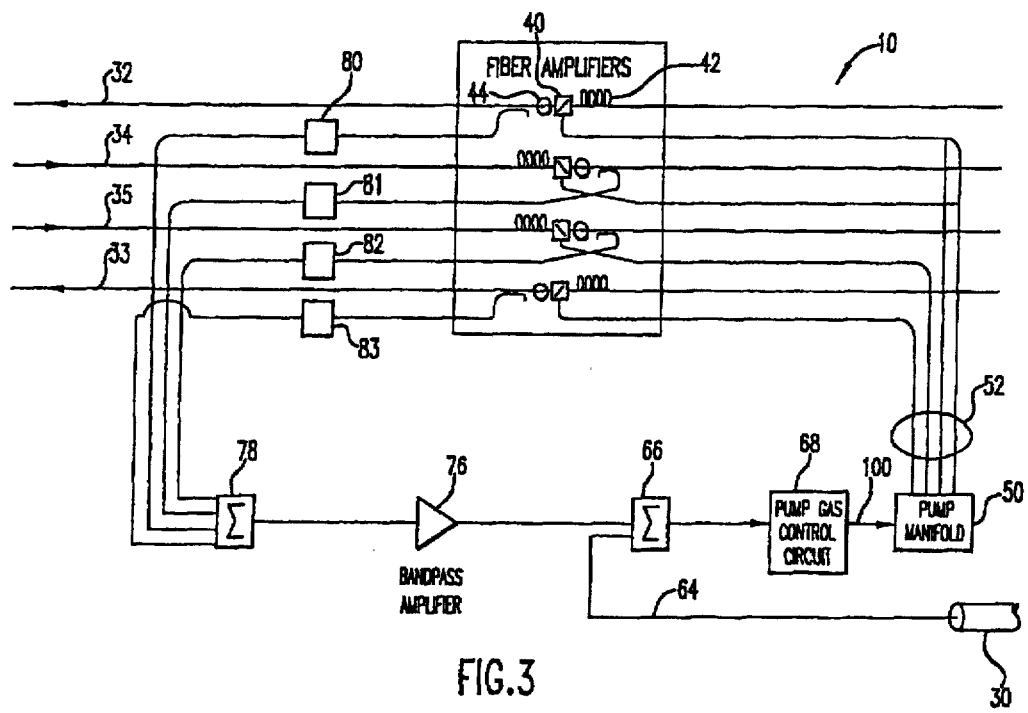

Signed and Sealed this

Sixth Day of November, 2001

Attest:

Nicholas P. Godici

Attesting Officer

NICHOLAS P. GODICI
*Acting Director of the United States Patent and Trademark Office*